Dec. 14, 1948.  J. BROSIUS, JR  2,456,487
STROBOSCOPIC PROJECTOR OF THE CONTINUOUSLY
MOVING FILM TYPE
Filed Sept. 10, 1946  8 Sheets-Sheet 6

Inventor
JOHN BROSIUS, JR.
By Kimmel & Crowell
Attorneys

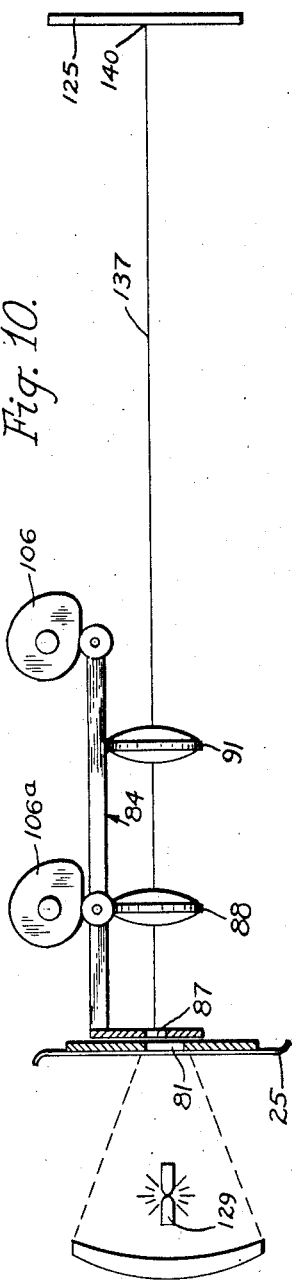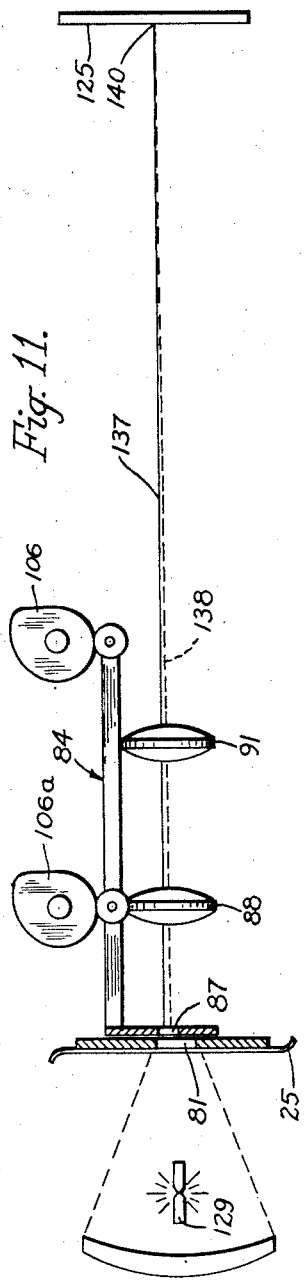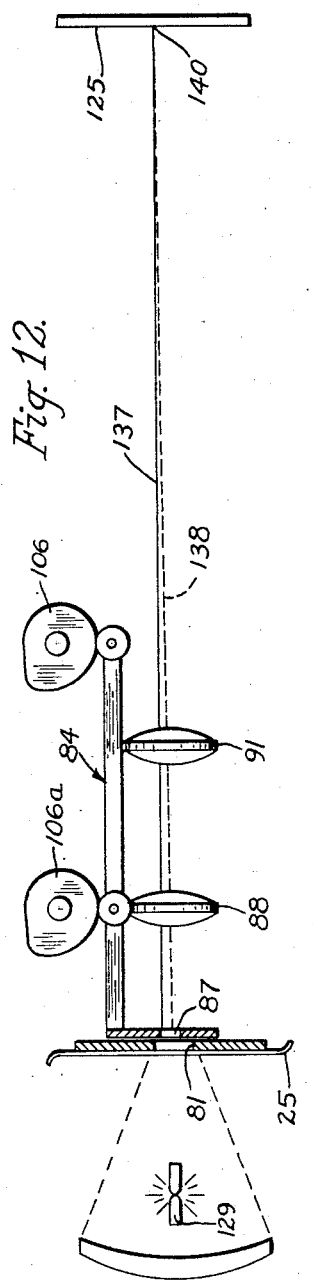

Dec. 14, 1948.   J. BROSIUS, JR   2,456,487
STROBOSCOPIC PROJECTOR OF THE CONTINUOUSLY
MOVING FILM TYPE
Filed Sept. 10, 1946   8 Sheets-Sheet 8
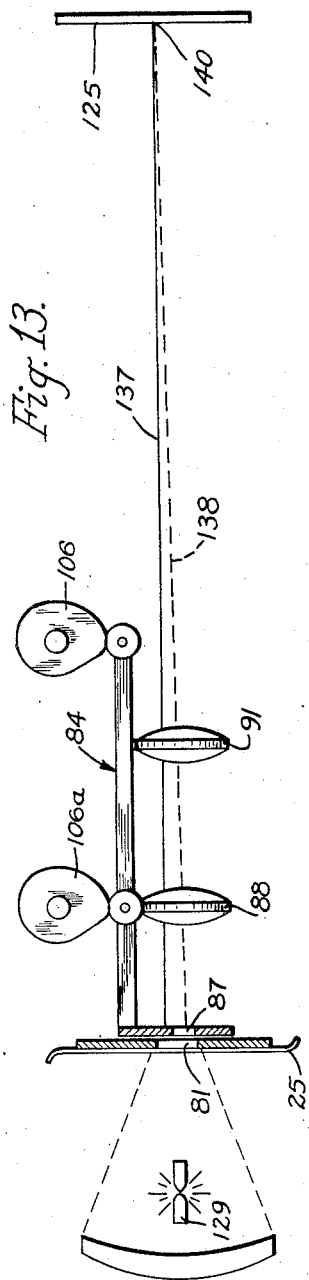
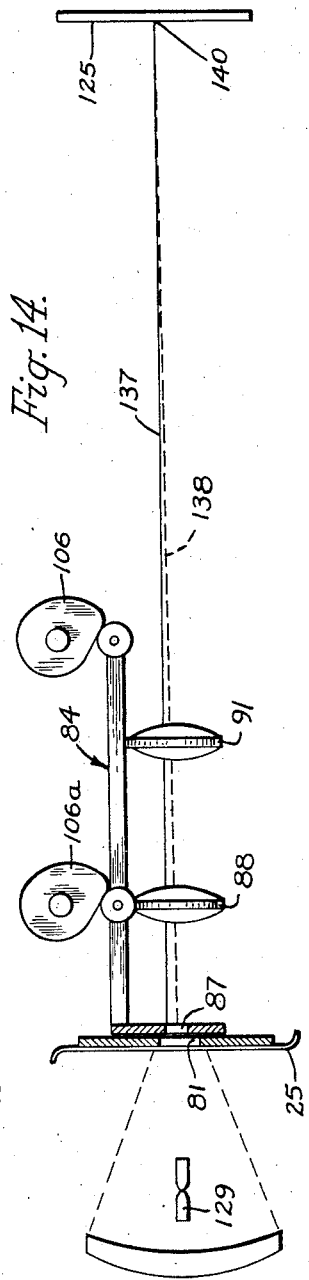
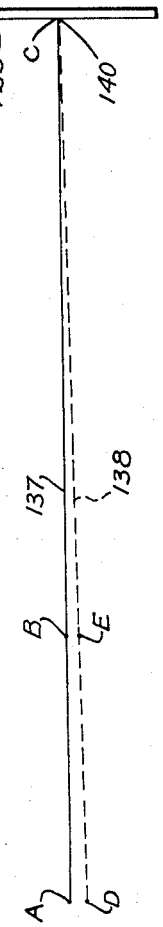
Inventor
JOHN BROSIUS, JR.
By Kimmel & Crowell
Attorneys Patented Dec. 14, 1948

2,456,487

UNITED STATES PATENT OFFICE 2,456,487

STROBOSCOPIC PROJECTOR OF THE CONTINUOUSLY MOVING FILM TYPE

John Brosius, Jr., Seattle, Wash.

Application September 10, 1946, Serial No. 695,968

9 Claims. (Cl. 88—16.8)

This invention relates to an improved motion picture projector.

An object of this invention is to provide a motion picture projector wherein the film travels through the projector at a constant speed as differentiated from the present type of projector wherein the film is passed through the projector with an intermittent motion.

Another object of this machine is to provide a motion picture projector wherein the film is passed through the projector at a constant speed and having means for moving the lens at a speed corresponding to the speed of the film whereby the projected image will remain stationary for a certain length of time on the screen.

Still another object of this invention is to provide a motion picture projector having means for moving the film at a constant speed, and means for moving the lens in registry with each frame of the film at a speed corresponding to the speed of the film during the time of exposure of each frame, in such a manner that the projected image will appear still on the screen during its exposure and means for focusing the image on the screen.

A further object of this invention is to provide a motion picture projector of this type and means for synchronizing the moving lens with the steadily moving film frames for properly projecting the complete frame on a screen.

To the foregoing objects and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figures 10, 11, 12, 13, 14 and 15 are diagrammatic views of the relation of the lens, cams, and screen, in various successive positions of the cams and lens.

Figure 1:
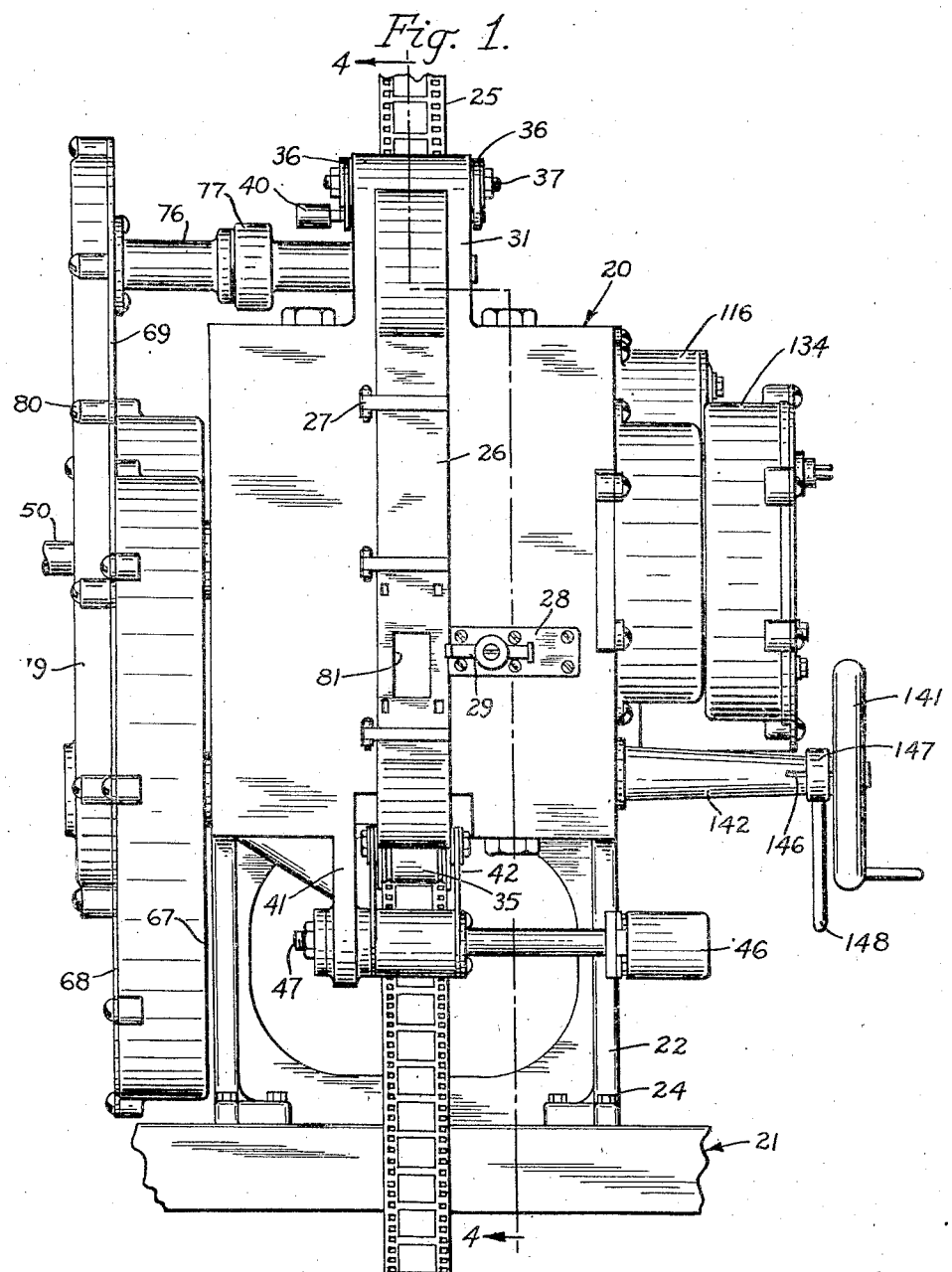
Figure 1 is a rear elevation of my stroboscopic motion picture projector.
Figure 2:
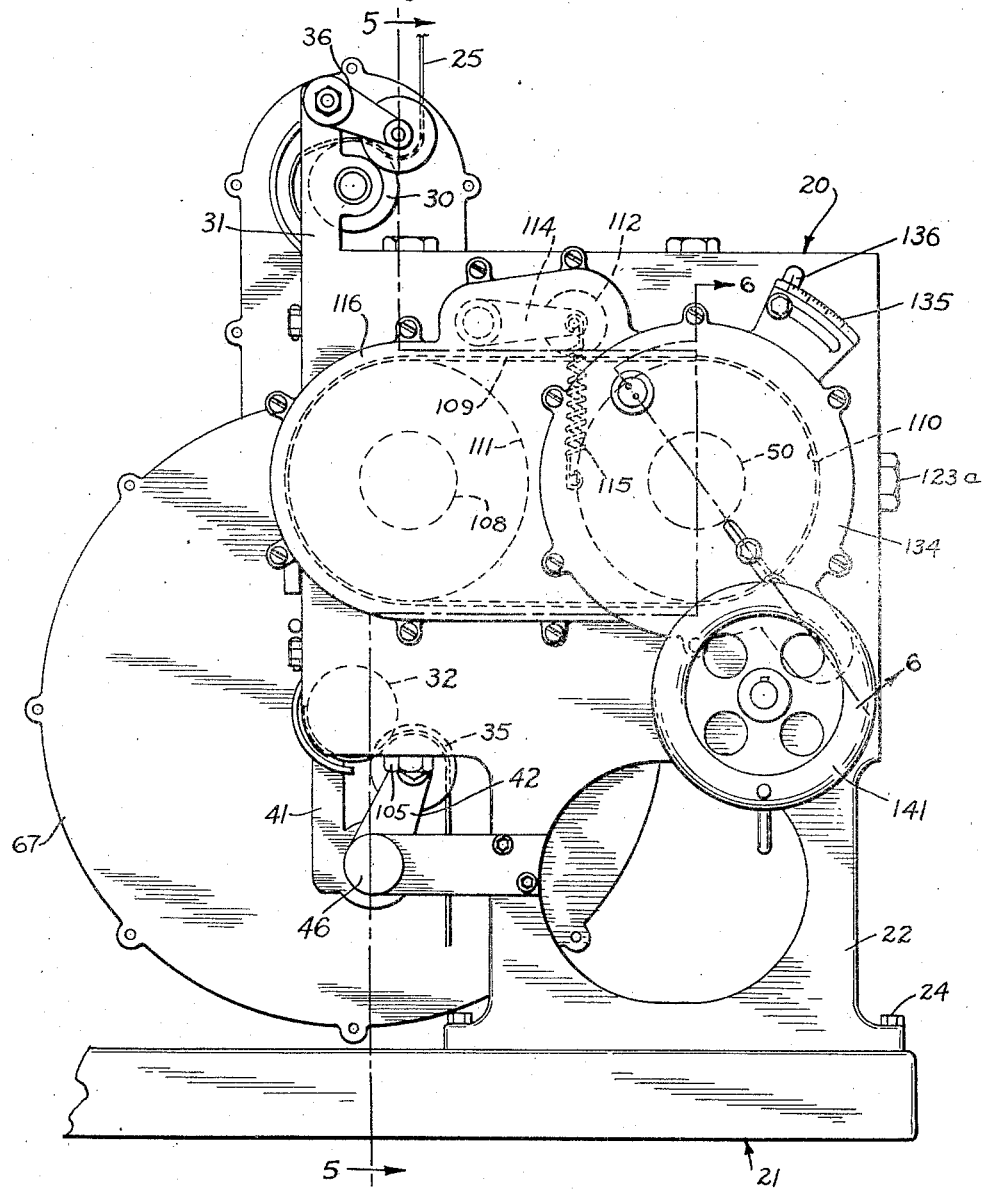
Figure 2 is a right side elevation.
Figure 3:
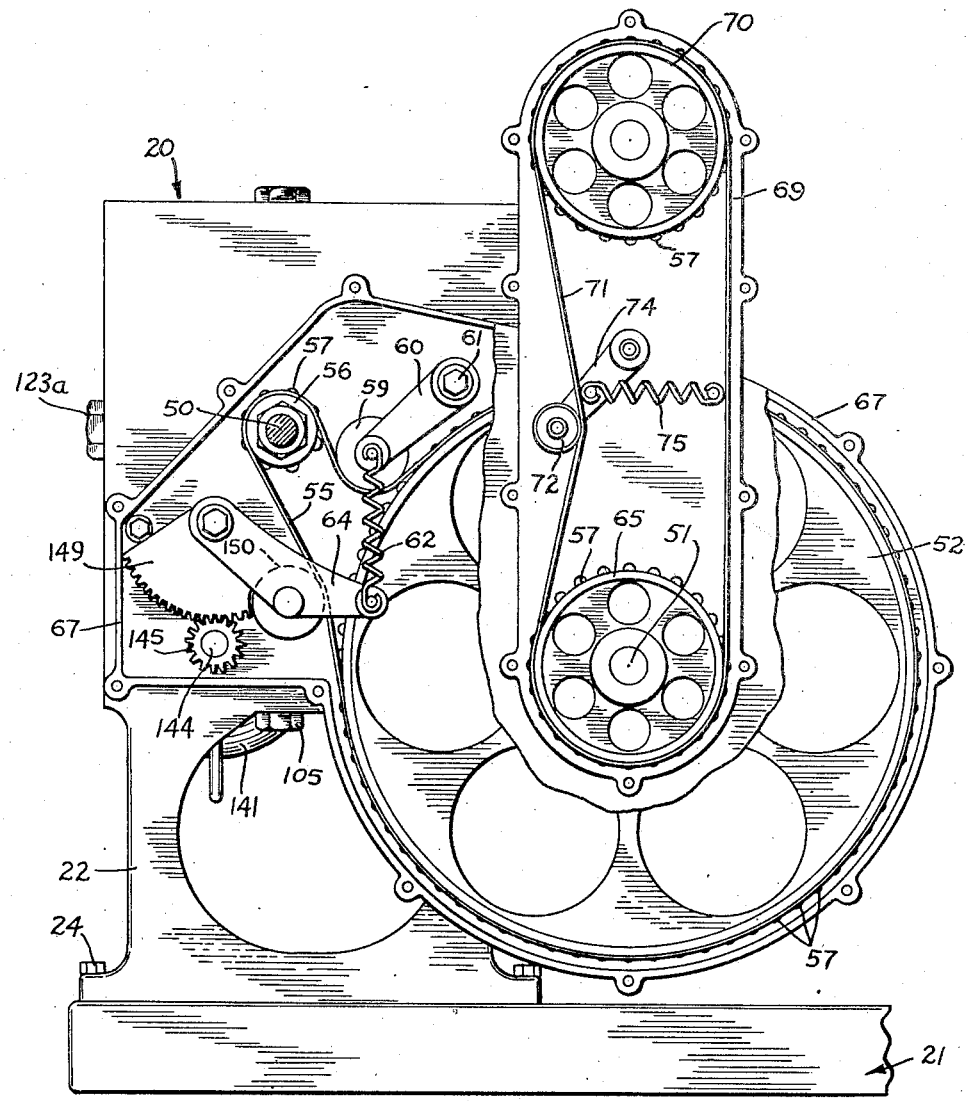
Figure 3 is a left side elevation partly broken away with the covers removed from the gear housings.
Figure 4:
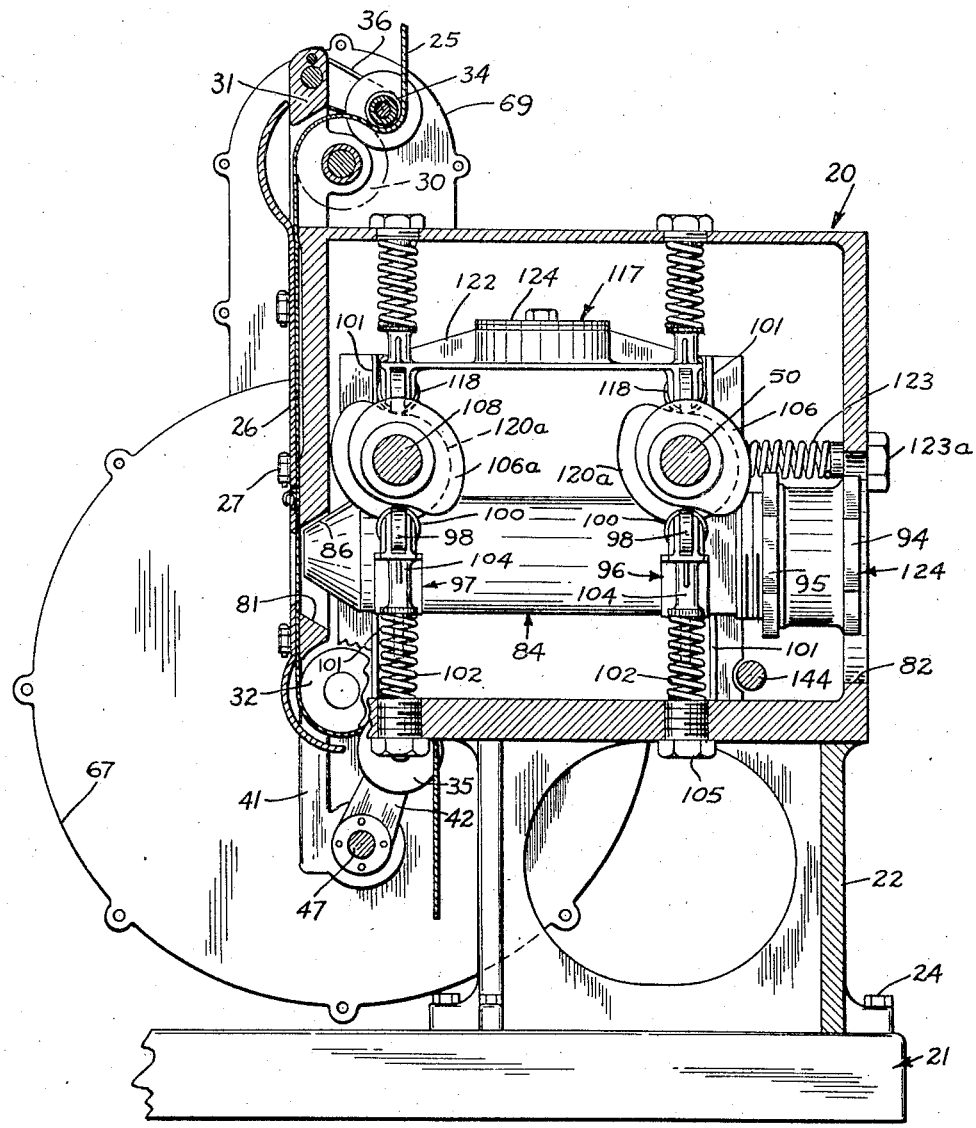
Figure 4 is a sectional view taken substantially on the line 4—4 of Figure 1.
Figure 5:
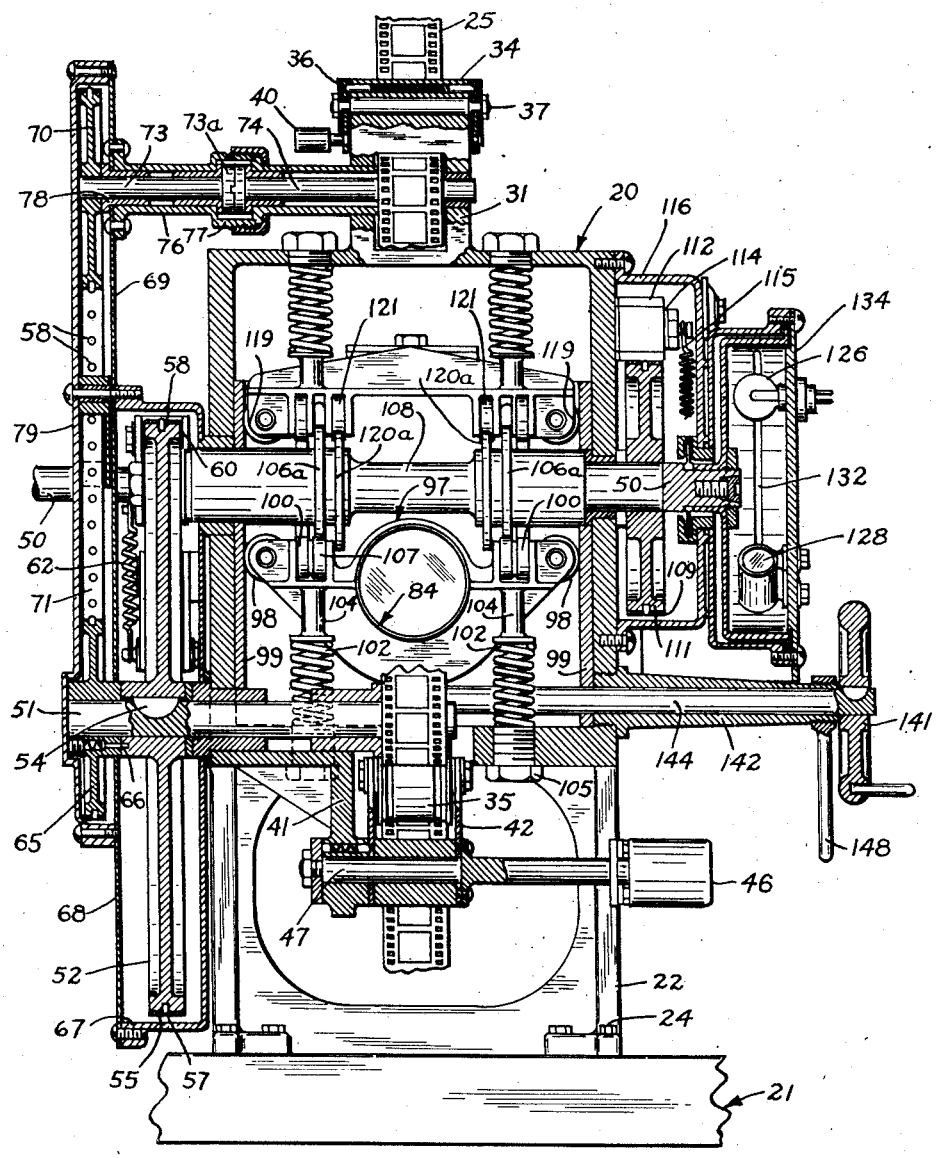
Figure 5 is a sectional view, taken substantially on the line 5—5 of Figure 2.
Figure 6:
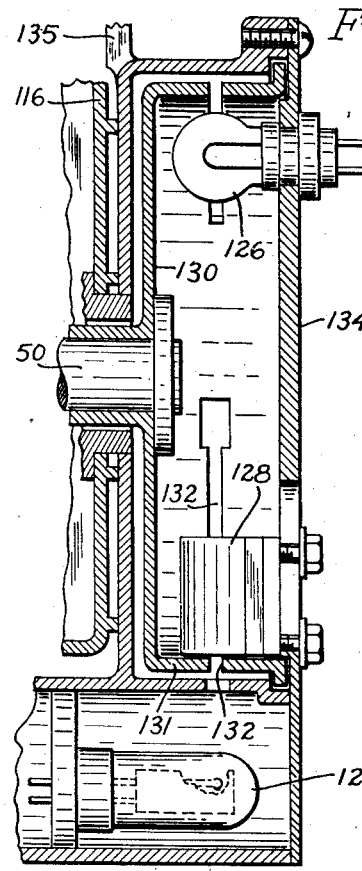
Figure 6 is a fragmentary sectional view taken on the line 6—6 of Figure 2.
Figure 8:
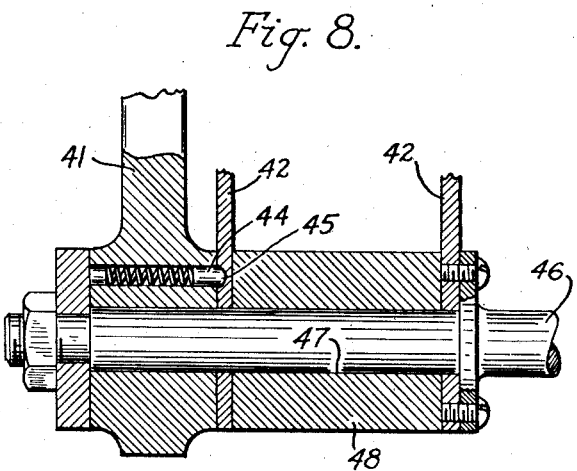
Figure 8 is an enlarged detail fragmentary section of the lower film guide.
Figure 7:
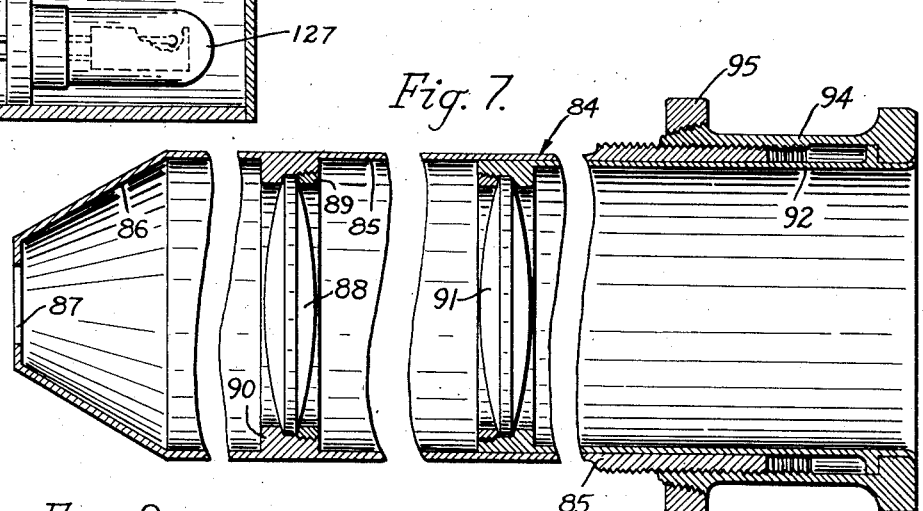
Figure 7 is a vertical section, partly broken away of the lens assembly removed from the projector.
Figure 9:
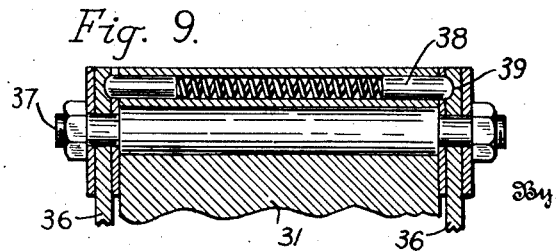
Figure 9 is an enlarged detail fragmentary section of the upper film guide.

Referring to the drawings the numeral 20 designates generally the casing or housing for a motion picture projector constructed according to an embodiment of this invention which is adapted to be supported above a base 21 by legs 22 which are secured to the base 21 by bolts 24 or other suitable fastening means. A film 25 is adapted to be passed over the rear side of the housing 20 from top to bottom and is held against the rear side of the housing 20 by elongated flat guide member 26 which is hingedly secured to the housing 20 along one vertical edge of the guide 26 by hinges 27. The guide member 26 is adapted to hold the film 25 against the casing 20 and overlies the film along its length on the housing 20. For installing or removing the film 25 the guide may be swung outwardly and is latched in its guiding or operative position by a sliding latch 28 having a keeper 29 slidably engaging over one edge of the guide member 26.

The film 25 is caused to move at a constant speed past the housing 20 engaging over an upper film engaging sprocket 30, supported above the front end of the housing 20 by a bracket 31, and a lower film engaging sprocket 32 supported by the lower end of the housing 20. The film 25 is then trained over an upper film roller 34 above the sprocket 30 and over a lower film roller 35 below the sprocket 32, and then to the respective upper and lower film magazines, not shown. The upper film roller 34 is pivotally supported behind the bracket 31 by a pair of arms 36 pivotally connected on each side of the bracket 31 by a through bolt 37. Spring pressed pins 38 are slidably carried by the bracket 31 and engage in detents 39 in the arms 36 for resiliently holding the arms in their lower or operating position, and a handle 40 is fixed on the roller for moving the roller 34 upwardly and disengaging the plates 36 from the pins 38 for rocking the roller upwardly out of engagement with the sprocket 30 for removing and installing the film.

A somewhat similar arrangement is provided for the lower roller 35. The roller 35 is supported from the bracket 41 by a pair of arms 42, and a spring pressed pin 44 slidable in the bracket 41 engages a detent 45 in one arm 42 for holding the roller 35 against the film 25 and sprocket 32. The handle 46 fixed to one of the arms 42 is rotatably supported by the bracket 41 and an extension of the handle 46 forms the pivot pin 47 for rotating the roller 35 out of engagement with the sprocket 32. The arms 42 are spaced apart on the pin 47 by a sleeve or spacer 48 which is loose about the pin 47.

A drive shaft 50 extends through the housing 20 transversely thereof towards the rear of the housing 20 and extends outwardly from the right side of the housing where it may be attached to any suitable power means for rotating this shaft 50. The sprocket shaft 51 of the lower film sprocket 32 extends from the housing 20 forwardly of and below the main drive shaft 50 and a large driving sprocket 52 is fixed thereon by a key 54 engaging in a slot in the shaft 51 and a corresponding slot in the hub of the sprocket 52. The sprocket 52 is driven by a flexible band 55 which also engages over a small sprocket 56 fixed on the main drive shaft 50. The sprockets 52 and 56 are formed with rounded teeth 57 on the outer periphery thereof, and openings 58 in the band 55 engage about the teeth 57 for firmly gripping the sprockets and holding the band 55 in fixed relation to the sprockets.

For tensioning the band 55 about the sprockets 52 and 56 there is provided a smooth surfaced idler roller 59 between the sprockets engaging the upper stretch of film. The roller 59 is pivotally supported by a pair of arms 60 engaging on either side of the roller 59 and loose at their other end on a bolt 61 fixed to the housing 20, and a spring 62 is fastened to the bearing shaft of the roller 59 at one end and to one end of a lever 64 at its other end. The lever 64 is a part of the synchronizing means to be hereinafter more fully described.

A second and smaller sprocket wheel 65 is slidable on the end of the shaft 51 and is rotated thereon by a spring pressed pin 66 slidably carried by the hub of the sprocket 65 and engaging in an opening in the hub of the sprocket 52.

A casing 67 is provided about the sprocket 52 and drive shaft 50 and is closed with a cover 68 on the outer side thereof and is formed with an upwardly extending plate 69 above the shaft 51 and sprocket 52. The sprocket 65 is carried on the outer side of the closure 68, and a similar sprocket 70 is supported from the plate 69 directly above the sprocket 65 for driving the upper film sprocket 30 in unison with the lower film driving sprocket 32. A flexible band 71 engages about both sprockets 65 and 70, the sprockets are formed with teeth 57 engageable in openings 58 of the band 71. An idling roller 72 is supported on the free end of an arm 74 which arm 74 is pivotally connected to the plate 69 between the sprockets 70 and 65 and a spring 75 between the arm 74 and a pin on the plate 69 constantly tensions the band 71. A drive shaft 73 is fixed to the sprocket 70 and is attached to a shaft 74a fixed to the film sprocket 30 by a shaft coupling 73a. A tube 76 and coupling 77 cover the shafts 73 and 74a between the plate 69 and sprocket 30. the shafts being supported therein by bearings 78. A housing 79 covers the sprockets 65 and 70 and belt 71 and is attached to the plate 69 and cover 68 by bolts 80 or other suitable fastening devices.

The housing 20 is provided with an elongated inwardly divergent opening 81 in the front wall and an elongated vertical opening 82 in the rear wall through which the light from the light source, not shown, is passed through the projector.

A lens carrier or holder 84 is vertically slidable in the housing 20. The lens holder 84 is formed with a cylindrical body or tube 85 having a frustro-conical outwardly convergent rear end 86 formed with a light aperture 87 in the rear wall thereof. A lens 88 is fixed in the tube 85 by an annular nut 89 engaging in an inwardly extending annular flange 90. A second or focusing lens 91 is slidably carried in the tube 85 for focusing the image of the film 25 on a screen. The lens 91 is fixed on the inner end of a second tube 92 slidable in the tube 85 and a nut 94, rotatably engaging about the outer or front end of the tube 92 threadably engages over the front end of the tube 85, and a lock nut 95 about the rear end of the nut 94 locks the nut 94 in adjusted position on the tube 85 for fixing the focus of the lens 91. The forward end of the nut 94 is slidable in the opening 82 being spaced therefrom and free from contact with the rear wall of the housing 20.

The lens holder 84 is slidably supported by a front carriage 96 and a rear carriage 97 slidable vertically in the housing 20. The lens carrier 84 is press fit and frictionally secured in the carriages 96 and 97. Rollers 98 having a longitudinally extending axle are supported on each side of the carriages 96 and 97 and engage longitudinal tracks or guides 99 which in turn are slidable longitudinally in the housing 20 for holding the carriages 96 and 97 against transverse motion during sliding up and down, and rollers 100, carried by the carriages 96 and 97, having transverse axles, engage front and rear vertical tracks or guides 101 in the housing 20 for holding the carriages 96 and 97 against longitudinal movement, whereby the carriages 96 and 97 are free to roll in a vertical direction between the guides or tracks 99 and 101. Pairs of vertically mounted springs 102, one on each side of each of the carriages 96 and 97 engage spring brackets 104 on each end of the carriages for constantly urging the carriages 96 and 97 upwardly. The upper end of the springs 102 engage the lower end of the brackets 104 and the tension of each spring 102 is adjustable by the lower end of each spring 102 engaging the upper end of set screws 105 which threadably engage through the bottom of the housing 20.

For oscillating the lens holder 84, the main drive shaft 50 extends through the housing 20 above the front carriage 96 and has fixed thereon a pair of cams 106 which engage axially supported rollers 107 mounted on the carriages 96 and 97 on each side of the lens carrier 84. The cams are so formed as to impart a motion of constant velocity downward on the carriages 96 and 97 for approximately three hundred (300) degrees of travel, the carriages 96 and 97 returning to the original starting position in about sixty (60) degrees to complete one cycle of operation. The rear lens carriage 97 is actuated by a shaft 108 above the carriage 97 by a flexible band 109 driven from the shaft 50. A sprocket 110 is fixed on the shaft 50 on the left side of the housing outwardly thereof and a sprocket 111 fixed on the shaft 108 is driven by the band 109 for driving the shafts 50 and 108 at the same speed. Cams 106a are fixed on the shaft 108 in the same manner as those on shaft 50 for oscillating the rear carriage 97 in the same manner as carriage 96. The cams 106a however are slightly larger than the cams 106 in order to move the rear carriage a slightly greater distance than the front carriage during each cycle of operation for the reason to be described more fully hereinafter. A band roller 112 engages the band 109 between the sprockets 110 and 111 for tensioning the band 109. The roller 112 is pivotally mounted on the side of the housing 20 by arms 114 and tensioned thereon by a spring 115 one end of which is fixed to the side of the housing 20. A cover 116 is provided for enclosing the sprockets 110 and 111 and the roller 112 on one side of the housing 20 opposite from the film driving sprocket cover 67.

The springs 102 must necessarily exert a large force on the carriages 96 and 97 in order that the rollers 107 will constantly engage the cams 106 and 106a at the speed of rotation of the shafts 50 and 108 without ever leaving the cams by reason of the momentum of the lens carrier moving downwardly. Upon rotation of the cams 106 and 106a an increasing force of the springs is applied on the shafts 50 and 108. This force, always in an upward direction will cause an unbalanced thrust force on the shafts unless balanced out by some means. Such means I have provided by a counterbalancing weight carriage 117 above the shafts 50 and 108. The counterbalance 117 is slidable vertically in the guides 101 and 99 by rollers 118 and 119 respectively. Cams 120 and 120a are fixed on the shafts 50 and 108 respectively for engaging rollers 121 on the carriage 117. The cams 120 and 120a impart the same constant velocity motion to the carriage 117 as the cams 106 and 106a impart to the lens carrier 84 but in an opposite direction whereby the force of the shafts 50 and 108 on the spring pressed carriages 96 and 97 is exactly counterbalanced by the force of the spring pressed counterbalance carriage 117, thus providing for the smooth rotation of shafts 50 and 108. This dynamic counterbalance 117 is formed with a frame 122 upon which may be secured weights 124 to statically and dynamically balance the lens carrier 84, the total weight of the lens carrier 84 and carriages 96 and 97 being equal to the total weight of the counterbalance 117, and therefore, the momentum of each member on opposite sides of the shafts is of equal magnitude and in opposite direction. The guide members or tracks 101 and 99 are held against sliding movement longitudinally in the housing 20 by horizontal springs 123 which engage the guides 101 on their front end and a bolt 123a fixed in the front wall of the housing 20.

In the use and operation of this projector the film 25 is engaged over the rollers 34 and 35 and the film feeding sprockets 30 and 32 and slides downwardly over the rear end of the projector within the guide 26 at a constant speed. The sprockets 30 and 32 are driven at a constant speed from the main drive shaft 50 through the sprockets, 52, 56, 65 and 70. The light, from a source not shown, passes through the film from behind the projector, through the opening 81, the lens assembly 84, the aperture 124 at the front of the lens assembly 84 and is projected upon a screen. As the film 25 travels downwardly the lens assembly travels downwardly at the same speed being actuated by the cams 106 and 106a on the drive shafts 50 and 108 respectively. The lens assembly 84 is in register with a frame of the film 25 during the downward movement of the assembly 84 whereby an image may be projected on a screen 125 and appear motionless thereon for the time required for one complete cycle of operation. As the lens assembly reaches the limit of its downward motion, it returns to its starting position to project the following frame of the film in about sixty degrees of revolution of the drive shafts. Since it is desirable to extinguish the light during this time when the lens assembly is returning to start a new cycle of operation, I have provided an electronic light control system timed with the movement of the lens assembly for extinguishing the light during the rotation of the drive shaft during which the lens assembly moves upwardly. This electronic light control includes a source of light energy or bulb 126, fixed relative to the housing 20 and a photo or selenium cell 127. The light passes from the bulb 126, through a condensing lens 128 and is directed onto the selenium or photo cell 127, whereby the source of light for the film 25, as an arc 129, is energized during the time the light is striking the cell 127. For extinguishing the arc 129, a disc 130 is rotatably carried by the shaft 50, the disc 130 having a flange 131 which passes between the condensing lens 128 and the selenium or photo cell 127. Slots or openings 132 are formed on opposite sides of the flange 131 whereby the light may pass through the flange 131 and strike the cell 127. The slots 132 extend about one hundred and twenty degrees about the annular flange 131 whereby the light does not strike the cell 127 during the remaining thirty degrees of a half of a complete revolution, the second of these thirty degree slots extinguishing the light at the time during which the lens assembly is moving upwardly. The bulb 126 and photo or selenium cell 127 are carried in a housing 134 which is secured on the cover 116. The housing 134 is rotatably adjustable about the shaft 50 for synchronizing the bulb 126 and cell 127 relative to the disc 130 and slot 132, and carries a vernier scale 135 for registering with an index 136 on the housing 20 which will indicate the relative position of the light control with respect to the disc 130 and shaft 50.

This electronic light control is more particularly described in my copending application Serial Number 695,969, of even date herewith.

In Figures 10 to 15 inclusive, the relative positions of the lenses, apertures and screen is shown for various positions of the cams 106 and 106a. In Figure 10 the lens assembly 84 is at its uppermost position whereby the opening 87 in the rear of the lens assembly is in register with a frame of the film 25, and in register with the upper end of the opening 81 in the rear of the housing 20. The solid line of the projector represents the axis line whereas in these diagrammatic views the dotted lines represent the line of the light projection or projection line 138. The axis line 137 represents the horizontal distance from the aperture 81 to the screen 125 and remains constant, the end of the line 137 designating the center of the image on the screen 125. The projection line 138 represents the light passing through the center of the aperture 87 and the center of the lenses 88 and 91. In Figure 10, at the start of the projection cycle the projection line 138 and axis line coincide and the center of the image is projected to point 140 on the screen 125. In order that the image will remain still during the cycle of operation, the axis line 137 and projection line 138 must coincide at the point 140 on the screen 128 a fixed distance from the lenses, and the rear cam 106a must move the rear lens 88 a greater distance downwardly relative to the movement of the front lens 91, and the cam 106a is therefore larger in circumference so the difference in travel of the lenses 88 and 91 increases relative to the rotation of the cams during the movement of the lenses downwardly. The arc 129 has been established at the start of the cycle.

In Figure 11 the cams 106 and 106a have been rotated 100 degrees, the aperture 87 being moved in registry with the frame of the film 25 and the axis line 137 and projection line 138 converge at point 140 on the screen 125.

In Figure 12 the cams have moved another 100 degrees, the aperture 87, still in unison with the film 25. In Figure 13 the cams have been rotated a total of 300 degrees and are at their limit of travel, the aperture 87 having reached its lowermost position in unison with the film 25, with the projection line 138 and axis line 137 still converging at point 140, and the arc still established. As the cams 106 and 106a move past 300 degrees the lenses 88 and 91 start to move upwardly as shown in Figure 14 to project the following frame on the film 25, and at this point the arc 129 is extinguished so no image is projected during the upward movement of the lenses. The upward movement is completed in sixty degrees of rotation of the cams and the cycle is ready to be repeated for projecting the next frame on the screen 125. The arc 129 is extinguished and as the cams reach 331 degrees the arc is started to be re-established so that a complete arc is established by the time a new cycle is to be started.

Consideration of the construction of the disc 130 and its relation to the drive shaft 50 will show that for each film frame cycle there will be two light cycles or impulses so that during the time one film frame is being projected, the arc 129 will be establshed and extinguished twice. By providing a higher frequency for the light cycle a much smoother projection will be presented on the screen.

In Figure 15 the mathematical relation of the travel of each lens to the distance between the lenses and the focal point 140 or C is shown. It is readily seen that for a given fixed focal distance AC the lenses when a distance AC and BC respectively from the point C must travel distances AD and BE respectively from the axis line 137 in order to project a still image. For a different length AC the distance between the lenses at A and B as AB must be varied according to the proportion AB : AC : BE : AD for projecting a still image.

As the film driving mechanism is driven from sprockets which are belt driven from the main drive shaft 50 and the lens assembly is driven directly from the shaft 50, after some use as when the band 55 has stretched or other variable factors have caused the film driving sprockets to be driven out of synchronization with the lens assembly, the band 55 may be pulled up or lowered on one side to bring the lens assembly into synchronization again with the film driving means by merely rotating a crank 141. The crank 141 is supported from one side of the housing 20 by an elongated tubular bearing shaft 142 fixed to the housing 20. The crank 141 is fixed on a shaft 144 which extends through the bearing 142 and housing 20. A spur gear 145 is fixed on the opposite end of the shaft 144 on the other side of the housing 20. The bearing 142 is formed with outwardly convergent outer walls which are slotted as at 146 at their outer end. A nut 147 having a handle 148 engages over outwardly converging tapered threads on the bearing 142 for locking the shaft 144 against rotation in a selected position. Rotating the crank 141 rotates the gear 145 which engages a segment gear 149 rotatably mounted on the housing 20. A pair of spaced apart arms 64 are fixed on the segment 149 and are rocked therewith. Intermediate the length of the arms 64 a pressure or adjusting roller 150 is supported for engaging the lower side of the flexible band 55 on the lower stretch between the driving sprocket 56 and film driving sprocket 52. The spring 62 between the arms 64 and arms 60 tensions the band 55 with a definite force irrespective of the position of the adjustable arms 64. The lower stretch of the band 55 is bent at an angle by the contact with the pressure roller 150 and the rotating of the segment 149 will increase or decrease the angle of the lower stretch thereby changing the relation of the sprockets 52 and 56 relative to each other whereby slight variations may be compensated for and the film 25 brought into synchronization with the lens assembly 84 at any time during the operation of the projector.

I do not mean to confine myself to the exact details of construction herein disclosed but claim all variations falling within the purview of the appended claims.

Having thus described my invention, what I claim is:

1. A motion picture projector comprising a housing, film driving sprockets on said housing, a drive shaft in said housing, a sprocket on said drive shaft, a flexible band engaging said sprocket on said drive shaft and one of said film driving sprockets for driving the film at a constant speed, lens supporting carriages slidable in said housing, cams on said drive shaft engaging said carriages for sliding said carriages downwardly in unison with the film during the projection of an image on the film, a counterbalance carriage slidable in said housing, cams on said drive shaft engaging said counterbalance carriage for sliding said counterbalance carriage oppositely from said lens supporting carriages for counterbalancing the thrust of said drive shaft, and means for synchronizing said lens supporting carriages with the film.

2. A motion picture projector comprising a housing, a drive shaft, belt driven sprockets driven from said drive shaft for driving the film at a constant speed, a lens assembly, spring pressed carriages for said lens assembly slidable in said housing, cams on said drive shaft engaging said carriages for sliding said lens assembly in unison with the film during projection of an image on the film, a spring pressed counterbalance for said shaft slidable in said housing, cams on said shaft engaging said counterbalance for sliding said counterbalance oppositely from said lens assembly whereby the thrust torque of said shaft on said lens assembly is counterbalanced, and an adjustable roller engaging the belt between said drive shaft and the film driving sprockets for synchronizing the film with said lens assembly.

3. A motion picture projector as set forth in claim 2 including manually operable means for adjusting said roller and means for locking said manually operable means in adjusted position.

4. A motion picture projector comprising a housing, means for driving the film at a constant speed, a lens assembly slidable in said housing, cams engaging said lens assembly at the front and rear end thereof for sliding said lens assembly in unison with a frame of the film during the projection thereof, the cams engaging the rear end of said lens assembly being larger than the cams engaging the front end thereof whereby the rear end of said lens assembly slides a greater distance than the front end in order that the projected image will remain constant at a certain distance from said projector.

5. A motion picture projector comprising a housing, a drive shaft in said housing, means driven by said shaft for driving a film through said projector at a constant speed, a lens assembly, a spring pressed carriage for said lens assembly slidable in said housing, cams on said drive shaft engaging said carriages for sliding said lens assembly in unison with the film, a counter-balance for said shaft slidable in said housing, cams on said shaft engaging said counter-balance for sliding said counter-balance oppositely from said lens assembly whereby the thrust torque of said shaft on said lens assembly is counter-balanced.

6. A motion picture projector comprising a housing, a drive shaft in said housing, an elongated lens supporting assembly slidable in said housing, means driven by said shaft for driving a film through said projector at a constant speed, a second shaft in said housing operatively connected to said drive shaft, a carriage on each end of the lens assembly, cams on said shafts engaging said carriages for sliding said assembly in registry with a frame of said film, the cams engaging the carriage on one end of said assembly being of a different size than the other cams for tilting said lens assembly during its sliding movement whereby the projected image will remain constant at a fixed distance from the projector.

7. A motion picture projector comprising a housing, means for driving a film at constant speed through said housing, a drive shaft, a lens supporting member slidable in said housing, a second shaft operatively connected to said drive shaft, differential cams on said shafts engaging said member for effecting differential sliding movement of the ends of said member, a counter-balance slidable in said housing, and cams on said shafts engaging said counter-balance for sliding movement opposite from said lens member.

8. A motion picture projector comprising a housing, means driving a film at constant speed through said housing, a lens supporting member slidable in said housing, a counter-balance member slidable in said housing, a drive shaft rotatable between said members, and cam means operatively connected to said drive shaft engaging said members for sliding said members in opposite directions upon rotation of said shaft for counter-balancing the thrust torque on said shaft.

9. A motion picture projector comprising a housing, a drive shaft in said housing, means driven by said shaft for driving a film through said projector at a constant speed, a lens assembly, a cariage for said lens assembly slidable in said housing, cams on said drive shaft engaging said carriages for sliding said lens assembly in unison with the film, a counter-balance for said shaft slidable in said housing, cams on said shaft engaging said counter-balance for sliding said counter-balance oppositely from said lens assembly whereby the thrust torque of said shaft on said lens assembly is counter-balanced.

JOHN BROSIUS, Jr.

REFERENCES CITED

The following references are of record in the file of this patent:

UNITED STATES PATENTS

| Number | Name | Date |
| --- | --- | --- |
| 546,093 | Eames | Sept. 10, 1895 |
| 1,111,229 | Momyer | Sept. 22, 1914 |
| 1,317,450 | Momyer | Sept. 30, 1919 |
| 1,336,996 | Boixeda | Apr. 13, 1920 |
| 1,798,793 | Hall | Mar. 31, 1931 |
| 1,914,854 | Hall | June 20, 1933 |
| 2,113,194 | Dorgelo | Apr. 5, 1938 |
| 2,257,938 | Clothier | Oct. 7, 1941 |
| 2,323,513 | Bamford | July 6, 1943 |
| 2,413,269 | Waller | Dec. 24, 1946 |

FOREIGN PATENTS

| Number | Country | Date |
| --- | --- | --- |
| 90,041 | Austria | Nov. 25, 1922 |
| 330,239 | Great Britain | June 2, 1930 |
| 760,778 | France | Dec. 27, 1933 |